United States Patent [19]

Richter et al.

[11] 4,256,999

[45] Mar. 17, 1981

[54] CONTROL SYSTEM FOR THE STROKE LIMITATION OF A MACHINE TOOL ELEMENT

[75] Inventors: Günter Richter, Nabern; Reinhard Fröschle, Ruit, both of Fed. Rep. of Germany

[73] Assignee: Maschinenfabrik Gehring K.G., Nellingen, Fed. Rep. of Germany

[21] Appl. No.: 846,031

[22] Filed: Oct. 27, 1977

Related U.S. Application Data

[63] Continuation-in-part of Ser. No. 597,201, Jul. 18, 1975, abandoned.

[30] Foreign Application Priority Data

Jul. 24, 1974 [DE] Fed. Rep. of Germany ....... 2435498

[51] Int. Cl.³ .............................................. G05B 1/06
[52] U.S. Cl. .................................. 318/560; 318/626; 318/285
[58] Field of Search ....................... 318/626, 663, 285

[56] References Cited

U.S. PATENT DOCUMENTS

| | | | |
|---|---|---|---|
| 3,403,310 | 9/1968 | Davidoff | 318/626 |
| 3,714,537 | 1/1973 | Burr | 318/626 |
| 3,924,171 | 12/1975 | Ukai et al. | 318/663 |
| 3,935,522 | 1/1976 | Tsay | 318/285 X |
| 4,122,379 | 10/1978 | Richter et al. | 318/632 |

*Primary Examiner*—B. Dobeck
*Attorney, Agent, or Firm*—Becker & Becker, Inc.

[57] ABSTRACT

A control system for the stroke limitation of a machine tool element in which the element is connected with the slider of a potentiometer so that the voltage on the potentiometer slider varies in a respective direction with each direction of movement of the tool element. A pair of adjustable resistors are provided which form voltage sources with voltages conforming substantially to that of the potentiometer slider at the desired points of reversal of the tool element. The slider voltage is compared with the voltage at the adjustable resistors and the tool element is reversed when the slider voltage bears a predetermined relation to the voltage with which it is compared. A selectively adjustable delay could also be provided to delay the reversing of the tool element at at least one of the limits of travel thereof.

22 Claims, 5 Drawing Figures

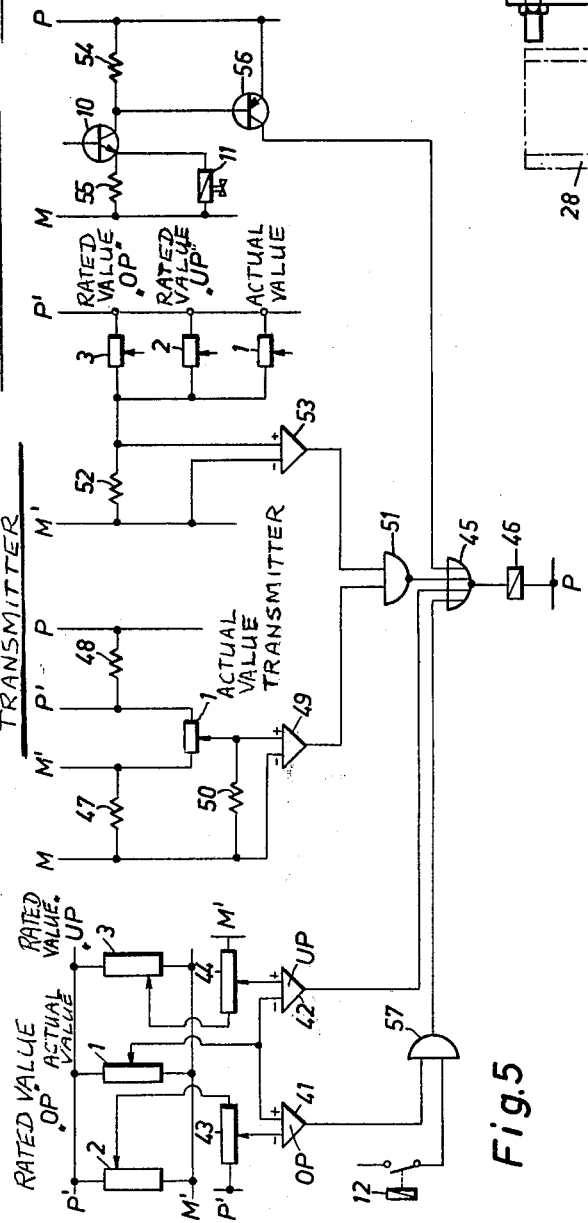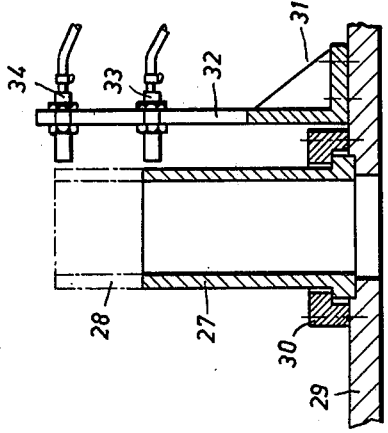
Fig.4
Fig.5

CONTROL SYSTEM FOR THE STROKE LIMITATION OF A MACHINE TOOL ELEMENT

This is a continuation-in-part of a co-pending application Ser. No. 597,201-Richter et al—filed July 18, 1975, now abandoned.

This invention relates to a honing machine having a tool carrier carrying a grinding tool for grinding a workpiece mounted on the machine, and in which said tool carrier or said workpiece is arranged to carry out to and fro movement of adjustable stroke length, said machine being provided with analogue control apparatus for controlling said stroke length. For reversing the machining movement at the limits of the stroke length without impacts, it is known to use adjustable electric signal generators which are set in accordance with the desired limit positions and provide as a rule two switch positions adjustable independently of one another.

It is easy to see that such control devices are much more complicated and expensive than conventional impact limited reversing motions. In particular, the signal evaluation is complicated and puts high demands on the maintenance staff and leads to production losses.

The known advantages of the impactless path limitation are counteracted at least partly by these drawbacks and limit considerably their use in particular in machines on which no extremely high demands on the reversing accuracy are made.

An object of the invention is therefore to provide a honing machine with analogue control apparatus which has the advantages of the impactless path limitation but is uncomplicated in construction and uses simpler and less expensive means compared with known control apparatus.

According to the invention therefore there is provided a honing machine having a tool carrier carrying a grinding tool for grinding a workpiece mounted on the machine, and in which, in use, said tool carrier or said workpiece is arranged to carry out to and fro movement of adjustable stroke length, said machine being provided with analogue control apparatus for controlling said stroke length, said control apparatus comprising a single actual value potentiometer adapted to be operated in correspondence with said movement so as to produce a potential representative of the actual position of the movable tool carrier or workpiece, two adjustable reference potentiometers for producing reference potentials, representative of reversing positions for the said movement, two threshold switches each having a first input connected to the said actual value potentiometer and a second input connected to a respective one of the reference potentiometers and being arranged to produce an output signal when the said potentials from the potentiometers as applied to such inputs are equal, a bi-stable memory device connected to the two threshold switches so that said output signals from the threshold switches can control switching of the memory device from one to the other of the stable states thereof, and a valve connected to the bi-stable memory device so as to be controlled thereby, said valve being arranged to control said machine movement.

The invention will now be described further by way of example only and with reference to the accompanying drawings, in which:

FIG. 4 is a sectional view of a workpiece holder to be arranged below the honing device shown in FIG. 3.

FIG. 5 is a diagram of a checking circuit for monitoring circuit elements of the control device.

Figure 1:
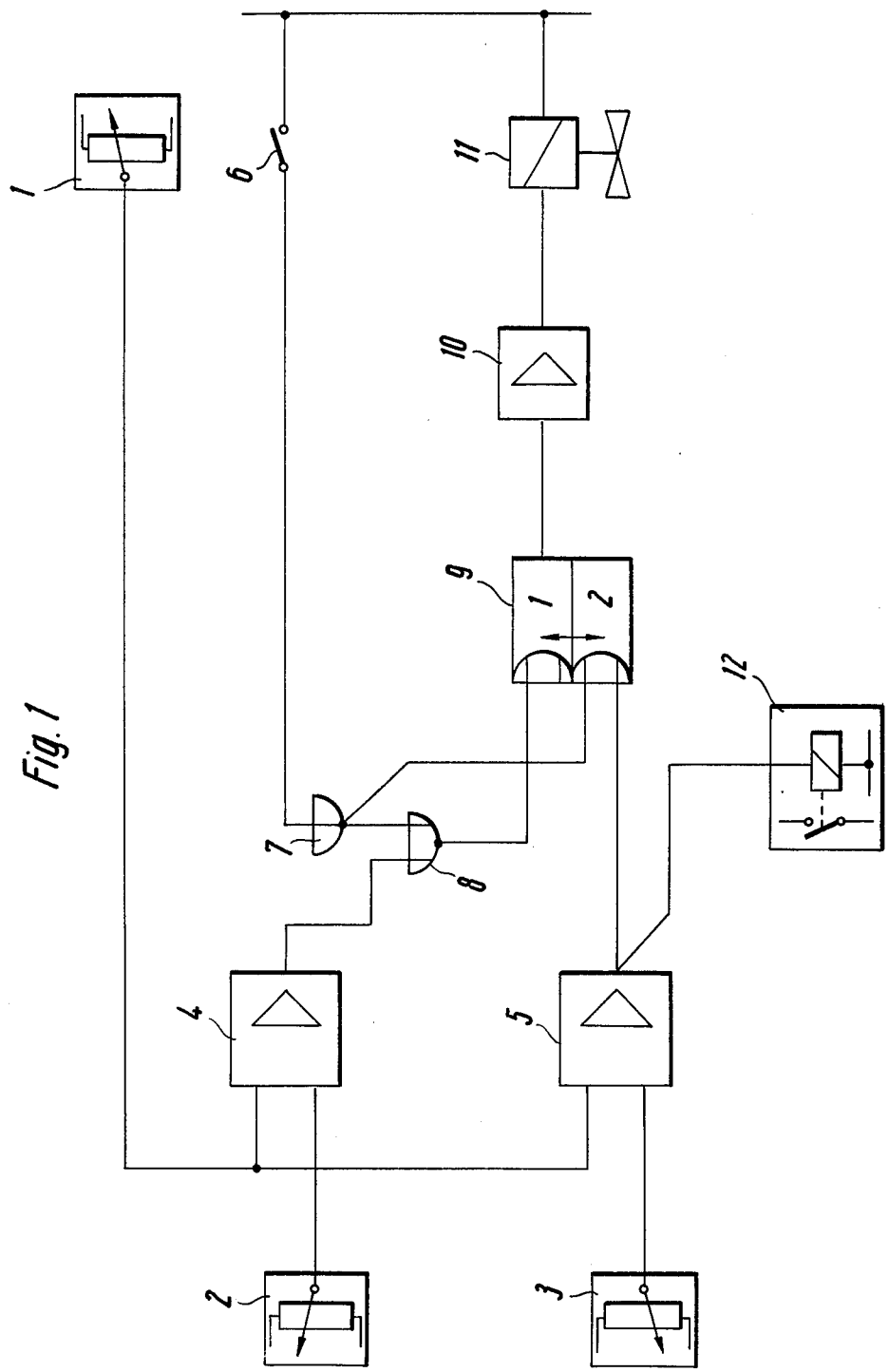
FIG. 1 is a diagram of the control apparatus of one form of a honing machine according to the invention.

The control apparatus in accordance with FIG. 1 comprises reference V value potentiometers 2 and 3 with which two reference potentials, corresponding to two nominal positions of the path of movement of a tool carrier 22 (FIG. 3) of a honing machine can be remotely selected independently of one another by rotation of knobs. The nominal positions are the reversing positions of the stroke of the tool carrier and the stroke can be selected within a permissible working range and can be varied during operation as desired in both directions.

An actual value potentiometer 1 is driven by known means, for example by a chain drive 23 (FIG. 3) from a movable sliding rod 24 of the honing machine to provide a potential corresponding to the actual position of the tool carrier 22. The potentiometer is a very low wear potentiometer with a sliding surface of synthetic material or plastics slide track. The potentiometers 1,2 and 3 are subjected to a flow of electric current therethrough so as to produce said potentials at sliders thereof which potentials depend on the positions of sliders.

For comparison of the potentials at the sliders of the reference value potentiometers 2, 3, which potentials correspond to the desired reversing positions, with the instantaneous slide potential of the actual value potentiometer 1, which corresponds to the actual position of the tool carrier, two associated amplifiers operating as threshold switches 4 and 5 are provided.

If the potential from the potentiometer 1 reaches the level of the potential selected with the appropriate potentiometers 2 or 3 dependent upon the direction of movement of the tool carrier, then the appropriate threshold switch 4 or 5 produces an output signal which effects reversal of the direction of movement of the tool carrier 22.

For a better understanding of the invention, the operating procedure with the embodiment according to FIG. 1 will now be described in more detail.

On commencement of the honing procedure, a starting switch 6 is closed by the operator or by a control device, whereupon an "0" signal is applied via an inverter 7 to one input of a NOR gate 8. The other input of the NOR gate 8 already receives an "0" signal from the switch 4 and the NOR gate 8 therefore produces a "1" signal at its output which is fed to an OR gate at one input of a two input bi-stable memory device 9 having two stable states indicated diagrammatically in FIG. 1 by numerals 1 and 2. The memory device 9 is switched to the state "1". Thereby via an amplifier 10 a magnetic valve 11 is controlled whereby the lifting movement of the tool carrier is started in the direction "downwards." The potential from the actual value potentiometer 1 now increases. Such potential eventually exceeds the potential selected with the potentiometer 2 whereupon the switch 4 produces a "1" signal at its output and the output of the NOR gate 8 changes to an "0" signal.

When the tool carrier reaches the position at which the potential from the actual value potentiometer 1 exceeds the potential selected with the reference value potentiometer 3 (reversing position "down") then the switch 5 produces a "1" signal which is fed to one input of an OR gate of the other input of the device 9, the other input of such OR gate receiving an "0" signal from the inverter 7.

The output signal from the switch 5 is also fed to a relay 12 which switches on in suitable manner the honing tool rotation and feed.

The device 9 is switched to the state "2" whereby the amplifier 10 is shut off. The magnetic valve 11 is thereby de-excited and the movement of the tool carrier reverses.

In the course of the "upwards" movement of the tool carrier the potential from the actual value potentiometer 1 drops again. When the tool carrier reaches the position at which the potential from the actual value potentiometer 1 is smaller than the potential selected with the reference value potentiometer 3 (reversing position "down") then the output signal of the switch 5 changes from "1" to "0".

In the further course of the movement the potential from the actual value potentiometer 1 reaches a value which is smaller than the potential selected with the reference value potentiometer 2 (reversing point "up") and the output signal of the switch 4 thereby changes from "1" to "0".

The device 9 is now switched over to its state "1" by the "1" signal produced at the output of the NOR gate 8. Thereby, via the amplifier 10 the magnetic valve 11 is controlled which initiates the reversing of the lifting movement; the tool carrier again travels "downwards," the potential from the actual value potentiometer 1 again increases. In the course of the movement the potential again reaches a value which is greater than the potential selected with the reference value potentiometer 2. The switch 4 then gives a "1" signal to the gate 8 whereby the output of the gate 8 changes from "1" to "0".

The reversing procedures are repeated until a stopping control is actuated by the operator or by an automatic work piece measuring device.

When the stopping control is actuated, then via a control device, not shown, the honing tool rotation and feed are switched off.

The starting switch 6 opens whereby the output of the inverter 7 changes from "0" to "1" which prevents the device 9 from switching to its state "1" and which switches the device 9 to its state "2" if it is in the state "1". The amplifier 10 shuts off and switches off the magnetic valve 11. The tool carrier now returns or insofar as it is already in the "upwards" movement, continues moving upwards to the starting position.

Additionally, with a further embodiment of the present invention, key switch means 58, 59 (FIG. 1) can be further provided which by virtue of logic elements 60, 61 make it possible for an operator at any time manually to take over the stroke control and direction of stroke movement for reversal thereof within the prescribed stroke path predetermined by the nominal value potentiometer.

Figure 2:
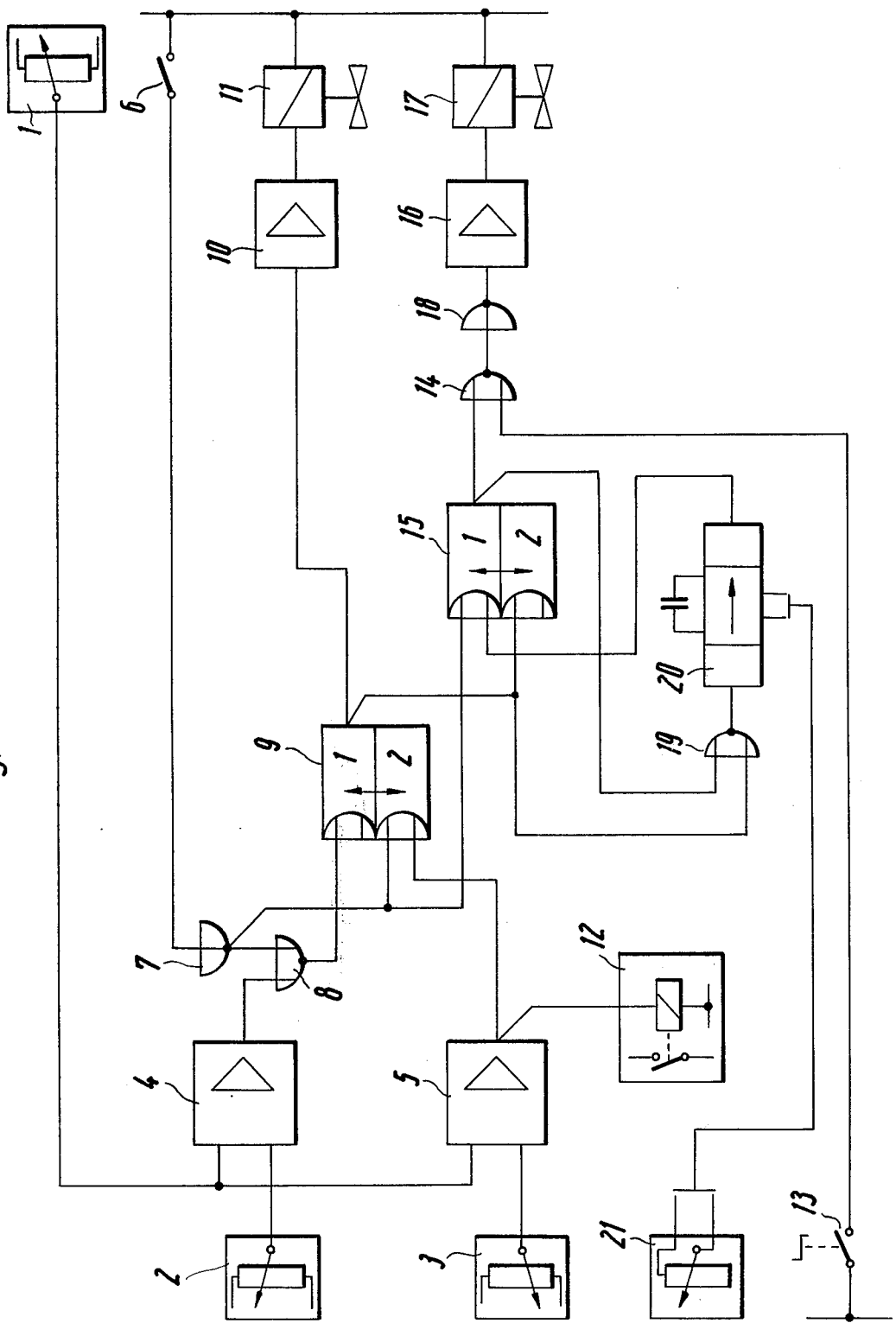
FIG. 2 is a diagram of a modification of the control apparatus of FIG. 1.

FIG. 2 represents a diagram of a control device according to the invention which can selectively be operated also with an adjustable automatic reverse delay at the lower reversing point. Such reversing delay is, for example, required when machining workpiece bores with an inner limitation. In FIG. 2, these structural elements which correspond to those according to FIG. 1 are given the same references.

The control apparatus according to FIG. 2, in addition to the structural parts described in connection with FIG. 1 also comprises a reversing delay arrangement consisting of parts which are designated with the reference numerals 13 to 21, namely a selector switch 13, a NOR gate 14, a second bi-stable memory device 15, an inverter 18 disposed in series with the NOR gate 14, an amplifier 16 in series with the inverter 18 and connected to a second magnet valve 17, a further NOR gate 19, a timing stage 20, and a potentiometer 21. The time stage 20 is connected to the output of the NOR gate 19. One input of the gate 19 is connected to the output of the second memory device 15, and the other input of the gate 19 is connected to the output of the first memory device 9 together with the amplifier 10. The delay time of the timing stage 20 can be adjusted with the aid of a potentiometer 21 to a desired value.

The operation of the control apparatus according to FIG. 2 is as follows:

If the selector switch 13 at the commencement of the honing operation is set by the operator to a position corresponding to "reverse delay" then via the NOR gate (which receives an "0" signal from the switch 13 and a "1" signal from the device 15 which is in its state "1") the amplifier 16 is switched on and thus the magnetic value 17 is actuated. When the starting switch 6 is closed then via the inverter 7 and the gate 8, the memory device is switched into its state "1". Thereby via the amplifier 10 the magnetic valve 11 is excited whereby the lifting movement of the tool carrier is initiated in the direction "downward". The potential from the actual value potentiometer 1 now increases. As the memory device 9 is in the state "1", the second memory device 15 is switched to its state "2". Via the gate 14 and the inverter 18, the amplifier 16 is shut off, and the magnetic valve 17 is deactuated.

If the movement of the tool carrier is so far "downward" that the potential from the actual potentiometer 1 is greater than the potential selected with reference value potentiometer "3" (reversing position "downward"), then the switch 5 gives a signal to the setting memory 9 and to the relay 12. The relay 12 then switches on the honing tool rotation and feed thereof. The memory device 9 is eventually switched to the state "2" whereby the amplifier 10 is shut off and thus the magnetic valve 11a is deactuated.

The lifting movement of the tool carrier now stops. As the memory devices 9 and 15 are now in their states "2" via the NOR gate 19, a signal is then applied to the timing stage 20 so as to actuate it.

The delay time of the timing stage 20 can be adjusted with the potentiometer 21 corresponding to the actual conditions, to the desired values.

When the delay time selected on the timing stage 20 elapses, the memory device 15 is switched into the state "1". Via the gate 14 and inverter 18, the amplifier 16 is thus switched on and the magnetic valve 17 is actuated which reverses the lifting movement in the direction "upward". When the tool carrier reaches a position at which the potential from the actual value potentiometer 1 is smaller than the potential selected with the reference value potentiometer 3 for the reversing point "downward," then the output signal of the switch 6 5 is switched off.

After further "upward" movement, the potential of the actual value potentiometer 1, becomes smaller than the potential selected with the reference value potentiometer 2 (reversing position "upward"), whereby the output signal of the switch 4 is turned off and via the gate 8 the memory device 9 is switched over into its state "1". Thereby, via the amplifier 10 the magnetic valve 11 is actuated which reverses the lifting movement in the direction "downward".

As the memory device 9 is in the state "1", the memory device 15 is switched over into its state "2". Via the gate 14 and inverter 18, the amplifier 16 is shut off, and the magnetic valve 17 deactuated.

When the movement of the tool carrier continues "downwards" until the potential from the actual value potentiometer 1 is greater than the potential selected with the reference value potentiometer 2, then the switch 4 gives a signal to the gate 8 whereby the signal for the memory devices 9 and 15 is switched off.

The reversing procedures are repeated until a stopping control is actuated. When the stopping control is actuated, via a control device the honing tool rotation and feed is switched off.

The starting switch 6 opens whereby the gate 8 and inverter 7 cause the switching over of the memory device 9 to its state "1" to be blocked and if the memory device 9 is already in the state "1", it is caused to be switched to its state "2", and the memory device 15 is held in its state "1". The amplifier 10 thereby shuts off and deactuates the magnetic valve 11.

The amplifier 16 is now switched on via the gate 14 and inverter 18 and actuates the magnetic valve 17. The tool carrier now returns not "upwards" insofar as it is already in the "upwards" and travels to the starting position.

If upon commencing the honing machining, the selector switch 13 is set at a position corresponding to "reversing delay off", then via the gate 14 and the inverter 18, the amplifier 16 is operated so as to hold the magnetic valve 17 permanently actuated. If now the starting switch 6 is closed then the operating course is substantially identical with that of the control apparatus according to FIG. 1.

In the described embodiment of the control device according to FIG. 2, one nominal value potentiometer each 2, 3 is provided for the setting of the reversing points. According to a further suggestion of the present invention, however, particularly for the automatic adaptation to different lengths of the workpiece, a plurality of nominal value potentiometers may be installed which, depending on the required structure length can automatically be reversed for instance by sensing the workpiece or by a manual selection by means of a selector switch.

As shown in FIG. 1, two additional potentiometers 2a and 3a are provided which may be connected to the circuit instead of potentiometers 2 and 3, respectively, by way of selecting switches 25, 26 (FIG. 1), and vice versa.

According to a further advantageous feature, it is provided that the making of contact of the slide at the actual value potentiometer is monitored by suitable means and the amplifiers are monitored as to a short circuit at their output. If the slide at the actual value potentiometer should not make contact or if a short circuit should occur at the output of an amplifier, the machine should be immediately stopped. Futhermore, it is also possible to monitor whether the reversal is effected or not effected at the predetermined points. When exceeding the preset value by a predetermined amount, a fault signal occurs so that the machine will immediately be stopped. In this way, possible damage to the tool, to the device and to the workpiece will be avoided.

Figure 3:
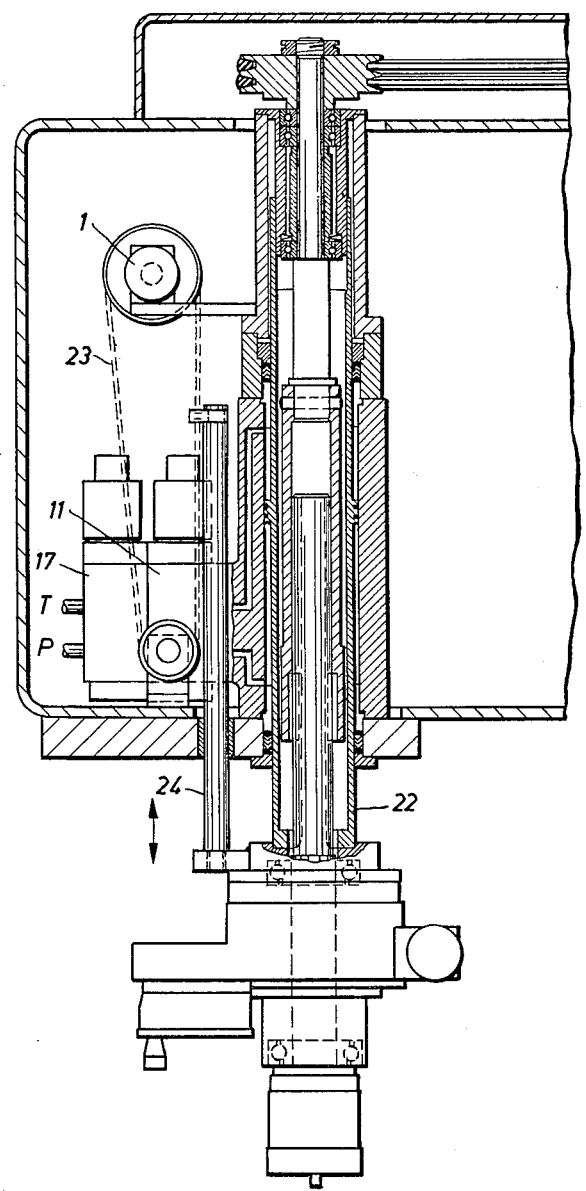
FIG. 3 is a sectional view of a honing device in a honing machine.

FIGS. 3 and 4 show a honing device known per se including the spindle of a honing machine and the electrical path sensing device. Reference is made in FIG. 4 only to the path sensing device associated with potentiometers 2 and 2a (FIG. 1). FIG. 3 shows how the actual value potentiometer 1 is mechanically coupled to sliding rod 24 by way of chain 23. Valves 11 and 17, as explained with reference to FIGS. 1 and 2 are schematically shown in FIG. 3. Thus, there is left open whether an inductive or ohmic or other type of electrical path sensing device is used. Such ohmic resistance identified particularly as a potentiometer is especially suitable for stroke limitation of a honing machine.

For these purposes, provision is made to monitor the described control device by way of a checking circuit which now will be described with reference to FIG. 5.

The voltages picked off by the taps of potentiometers 1, 2 and 3 are applied through terminals A, B and C, respectively, to the checking device shown in FIG. 5 as will be described below. Terminals E and F of amplifier 10 and terminal D of relay 12 (FIG. 1) are likewise shown in FIG. 5.

FIG. 5a shows the portion of the circuit with which there is checked whether the reversing has occurred or not occurred at the predetermined points. For this purpose, the slider or tap of the actual value potentiometer 1 is connected to the "plus" input of a first operational amplifier 41 determining the "upper" reversing point (o.P.), furthermore the slider is connected to the "minus" input of a second operational amplifier 42, determining the "lower" reversing point (u.P.). The "minus" input of the operation amplifier 41 is connected through an adjustable potentiometer 43 with the slider or tap of the nominal value potentiometer 2 and the "plus" input of the operational amplifier 42 is connected through a potentiometer 44 with the slider or tap of the nominal value potentiometer 3. If the slider of the actual value potentiometer 1 is within the limits defined by the nominal value potentiometers 2 and 3, then both operational amplifiers 41, 42 are in "low" condition, which means no signal at their outputs occur since the voltage at the slider of the actual value potentiometer 1 is equal to or smaller than potential at the slider of the nominal value potentiometer 2 which is at the same potential P' M', respectively, the potential of the potentiometer 1 being equal to or greater than the potential at the slider of the nominal value potentiometer 3 at the same potential P' M'.

If now for any reason the reversing at the "upper" respectively "lower" reversing point is not effected, accordingly the potential at the input of the operational amplifier 41 respectively 42 changes, provided that a safety range is exceeded, which range is determined by hysteresis of the system and is adjustable by setting the potentiometer means 33 respectively 44. Hence the operational amplifier 41, respectively 42 is changed at its output to the "high" condition. This means at the output of the operational amplifier 41 respectively 42 there now appears a "1" signal which causes stopping the machine by way of the logic circuit elements 45, 57 respectively element 45 and the relay 46. The AND gate 57, the second input of which is connected to the relay 12 assures that the "1" signal at the output of the operational amplifier 41 for the "upper" reversing point becomes effective only when the honing tool rotation and feeding mechanism is switched on.

FIG. 5b shows a further part of the checking circuit with which the contact giving of the slider of the actual value potentiometer 1 is monitored. This potentiometer 1 is at a smaller potential P' (+) and M' (−) derived from the potential P (+) and M (−) via the low-resistance resistors 47 respectively 48 (FIG. 1 and FIG. 5b).

The slider of the actual value potentiometer 1 is connected to the (+) input of an operational amplifier 49 and is at a potential M via the high resistance resistor 50. Since the "minus" input of the operational amplifier is at a more negative potential M in any event when compared to the potential at the slide, an "1" signal appears at the output of the amplifier. If now for any reason whatever there occurs a contact interruption at the slide of the actual value potentiometer 1, according also the "plus" input of the operational amplifier 48 is at the potential M via the high-resistance connection 50 and the operational amplifier 49 changes at its output from an "1" to an "0" signal. Accordingly, the machine is stopped by virtue of the logic elements 45, 51 and the relay 46.

FIG. 5c shows the portion of the checking circuitry, in a schematic illustration, with which the potentiometers 1, 2 and 3 are monitored for wire breakage or interruption.

All three potentiometers 1, 2 and 3 are in parallel connection and coupled in a series circuit with a low-resistance resistor 52 to the potential P'M'. The line connecting the potentiometers 1, 2, 3 and the resistor 52 is connected to the "plus" input of an operational amplifier 53 the minus input of which is at the potential M'.

If all three potentiometers are faultless, an "1" signal exists at the output of the operational amplifier 53. If a wire break occurs in the circuit of one of the potentiometers 1, 2 or 3, the voltage at the plus input of the operational amplifier 53 will drop and a change occurs at the amplifier output from the "1" signal to "0" signal. This signal change causes stopping of the machine by virtue of the logic circuit elements 51, 45 and the relay 46.

Finally, FIG. 5d shows schematically the checking circuit for the short circuitry monitoring of the output of the amplifier 10. The input of the amplifier 10 is at a potential P which is applied via a low resistance resistor 54 to the amplifier input and the output of the amplifier is connected to the magnetic valve 11 operated for the stroke reversal and additionally, this output terminal of amplifier 10 is coupled through a high resistance resistor 55 to potential M.

The input voltage of the amplifier 10 is applied to the control input or base of a transistor 56 which is held in a nonconductive state.

If now there occurs a short circuit at the output of the amplifier 10, the current rises abruptly and the voltage drop at the low resistance 54 increases considerably, which means in the control input of the transistor 56 there appears suddenly a considerably high voltage. The transistor 56 consequently changes into the conducting state and will produce a signal which is used to cause stopping the machine by virtue of the logic circuit element 45 and the relay 46.

It is, of course, to be understood, that the present invention is by no means, limited to the specific showing in the drawings, but also comprises any modifications within the scope of the appended claims.

What is claimed is:

1. In combination with an analogous control system for very accurately controlling the stroke of an abutment-free machine element, especially the spindle of a honing machine having a rotary honing tool; at least one electric displacement pick-up for an abutment-free stroke limitation of the machine element and including first resistor means adjustable in conformity with the desired stroke end points, second resistor means variable in conformity with the machining movement of the machine element, and circuit means for comparing the voltages in said second resistor means due to preset value of current flow therein and operable for controlling the limiting of stroke movement of said element, said circuit means further including amplifier means, and signal means operable upon faulty operation of said second resistor means or of said amplifier means.

2. In combination with an analogous control system for very accurately controlling the stroke of an abutment-free machine element, especially the spindle of a honing machine having a rotary honing tool; at least one electric displacement pick-up for an abutment-free stroke limitation of the machine element and including first resistor means adjustable in conformity with the desired stroke end points, second resistor means variable in conformity with the machining movement of the machine element, and circuit means for comparing the voltages in said second resistor means due to preset value of current flow therein and operable for controlling the limiting of stroke movement of said element, said means for continuously monitoring the operation of said system at at least one of said stroke end points.

3. A control system in combination according to claim 2 in which said second resistor means is a potentiometer having a slider moveable in conformity with the movement of said element.

4. A control system in combination according to claim 3 in which said potentiometer is a field plate potentiometer.

5. A control system in combination according to claim 2 in which the resistance path of said potentiometer includes synthetic material.

6. A control system in combination according to claim 2 in which said first resistor means comprises a pair of independently adjustable resistors and said circuit means includes a pair of threshold valve switches operable for comparing the voltage in each said resistor to the voltage in said second resistor means and each operable to emit a signal in conformity with the respective compared voltage values.

7. A control system in combination according to claim 6 in which the signals emitted by said threshold valve switches control the reversing of said machine element at respective stroke end points.

8. A control system in combination according to claim 2 in which said circuit means includes adjustable time delay means operable to delay the preselectable reversing of said machine element at least one stroke end position.

9. A control system in combination according to claim 8 which includes means for adjusting the amount of said delay.

10. A control system in combination according to claim 2 in which said first resistor means includes a plurality of independently adjustable resistors.

11. A control system in combination according to claim 10 which includes means for making selected ones of said resistors effective while making the others thereof effective to change the stroke of said machine element.

12. A control system in combination according to claim 11 which includes means for sensing the length of a workpiece to be honed and for automatically selecting said resistors in conformity with the sensed length of the workpiece.

13. A control system in combination according to claim 2 which includes manual control means for controlling the reversing of said machine element.

14. An analogous system for an abutment-free reciprocating machine element for reversing the element at predetermined end positions comprising in combination; a control component having a first condition for movement of the element in one direction and a second condition for movement of the element in the other direction, a first terminal on said control component sensitive to a second signal to cause said component to go to said second condition, a first resistor having a slider connected to be moved with said element so the slider voltage varies in a respective direction for each direction of movement of the element, a second resistor for one end position of the element and a third resistor for the other end position of the element, said second and third resistors being independently adjustable and forming respective voltage sources when current is passing therethrough, first and second voltage comparators connected for comparing the voltage at said slider with the voltage of the second and third resistors respectively and each emitting a signal when the slider voltage bears a predetermined relation to the voltage of the respective resistor at the respective end position of said element, a start switch operable when actuated to emit a signal, means responsive to a signal from said start switch and from one of said comparators to generate a said first signal at said first terminal, and means responsive to a signal from the other comparator to generate a said second signal at said second terminal.

15. A honing machine having a tool carrier carrying a honing tool for honing a work-piece mounted on the machine, and in which, in use, said tool carrier or said workpiece is arranged to carry out to and fro movement of adjustable stroke length, said machine being provided with analogue control apparatus for controlling said stroke length, said control apparatus comprising a single actual value potentiometer adapted to be operated in correspondence with said movement so as to produce a potential representative of the actual position of the movable tool carrier or workpiece, two adjustable reference potentiometers for producing selected reference potentials, representative of reversing positions for the said movement, two threshold switches each having a first input connected to the said actual value potentiometer and a second input connected to a respective one of the reference potentiometers and being arranged to produce an output signal when the said potentials from the potentiometers as applied to such inputs are equal, a bi-stable memory device connected to the two threshold switches so that said output signals from the threshold switches can control switching of the memory device from one to the other of the stable states thereof, and a valve connected to the bi-stable memory device so as to be controlled thereby, said valve being arranged to control said machine movement.

16. A honing machine according to claim 15, characterized in that the actual value potentiometer has a plastics slide track.

17. A honing machine according to claim 15, characterized in that a timing stage is provided to give a predetermined delay at one reversing position during which said machine movement is arrested.

18. A honing machine according to claim 17, characterized in that the delay time can be adjusted with an additional potentiometer.

19. A honing machine according to claim 15, characterized in that there are provided further potentiometers set for different stroke lengths and which can selectively be brought into use by means of a manual selector switch.

20. A honing machine according to claim 15, characterized in that there are provided further reference potentiometers set for different stroke lengths and which can selectively be brought into use automatically in dependence on sensing of the workpiece length.

21. A honing machine according to claim 15, characterized in that provision is made for monitoring contacting of the slide of the actual value potentiometer, and also for monitoring amplifiers used in control apparatus for short cirucits at outputs thereof.

22. A honing machine according to claim 15, characterized in that provision is made for checking that reversing takes place at the desired positions.

* * * * *